United States Patent
Aybay et al.

(10) Patent No.: US 8,266,343 B2
(45) Date of Patent: *Sep. 11, 2012

(54) SYSTEMS AND METHODS FOR AUTOMATED SENSOR POLLING

(75) Inventors: Gunes Aybay, Los Altos, CA (US); Shreeram Siddhaye, Sunnyvale, CA (US); Srinivas Gadgil, Cupertino, CA (US); Euan F. Mowat, San Francisco, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/210,072

(22) Filed: Aug. 15, 2011

(65) Prior Publication Data

US 2011/0302351 A1 Dec. 8, 2011

Related U.S. Application Data

(63) Continuation of application No. 12/015,652, filed on Jan. 17, 2008, now Pat. No. 8,024,499.

(51) Int. Cl.
*G06F 3/00* (2006.01)
*G06F 5/00* (2006.01)
(52) U.S. Cl. ........................................................ 710/46
(58) Field of Classification Search ...................... 710/46
See application file for complete search history.

(56) References Cited

U.S. PATENT DOCUMENTS

| | | | |
|---|---|---|---|
| 4,168,532 A | 9/1979 | Dempsey et al. | |
| 4,598,363 A | 7/1986 | Clark et al. | |
| 5,615,323 A | 3/1997 | Engel et al. | |
| 5,862,338 A | 1/1999 | Walker et al. | |
| 5,889,963 A | 3/1999 | Gopal et al. | |
| 6,205,503 B1 | 3/2001 | Mahalingam | |
| 6,973,044 B1 | 12/2005 | Barach | |
| 7,003,607 B1 | 2/2006 | Gulick | |
| 2004/0052258 A1 | 3/2004 | Robertson | |
| 2006/0168396 A1 | 7/2006 | LaMothe et al. | |
| 2007/0076006 A1 | 4/2007 | Knepper et al. | |
| 2008/0177507 A1* | 7/2008 | Mian et al. | 702/189 |
| 2008/0247313 A1* | 10/2008 | Nath et al. | 370/231 |
| 2008/0288662 A1* | 11/2008 | Doorenbos | 710/4 |

OTHER PUBLICATIONS

Co-pending U.S Appl. No. 12/015,652, filed Jan. 17, 2008 entitled "Systems and methods for automated sensor polling" by Gunes Aybay et al., 23 pages.

* cited by examiner

*Primary Examiner* — Henry Tsai
*Assistant Examiner* — Eric Oberly
(74) *Attorney, Agent, or Firm* — Harrity & Harrity, LLP

(57) ABSTRACT

A device may include polling logic configured to store a table of received addresses, sequentially receive sensor data from each address in the table via a serial data bus, store the sensor data in a memory, receive an address from a processor via a high speed data bus, and provide stored sensor data from the memory to the processor via a parallel data bus.

18 Claims, 6 Drawing Sheets

400 →

| 1 | TARGET BOARD 410 | I2C ADDRESS 420 | SIZE 430 | POLLING RATE 440 | |
|---|---|---|---|---|---|
| 2 | TARGET BOARD 410 | I2C ADDRESS 420 | SIZE 430 | POLLING RATE 440 | |
| ⋮ | ⋮ | ⋮ | ⋮ | ⋮ | ⋮ |
| N | TARGET BOARD 410 | I2C ADDRESS 420 | SIZE 430 | POLLING RATE 440 | |

| 1 | TARGET BOARD 510 | I2C ADDRESS 520 | SENSOR DATA 530 | TIME STAMP 540 |
|---|---|---|---|---|
| 2 | TARGET BOARD 510 | I2C ADDRESS 520 | SENSOR DATA 530 | TIME STAMP 540 |
| ⋮ | ⋮ | ⋮ | ⋮ | ⋮ |
| N | TARGET BOARD 510 | I2C ADDRESS 520 | SENSOR DATA 530 | TIME STAMP 540 |

SYSTEMS AND METHODS FOR AUTOMATED SENSOR POLLING

RELATED APPLICATION

This application is a continuation of U.S. patent application Ser. No. 12/015,652 filed Jan. 17, 2008, which is incorporated herein by reference.

BACKGROUND INFORMATION

Network devices, such as switches or routers, may contain numerous electronic components and circuit boards. Commonly, a sensor, such as a temperature sensor or a voltage sensor, is included on or with the electronic component and/or circuit boards to monitor temperature and voltage parameters. The numerous sensors are commonly connected to a main processing device via a slow two wire bus. Waiting for large amounts of sensor data to be received sequentially from numerous sensors over slow two wire buses results in substantial processing time being wasted by the main processing device.

SUMMARY

According to one aspect, a device may be provided. The device may include a processor, a plurality of sensors and polling logic configured to receive an address for each of the plurality of sensors from the processor, store the received addresses in a table, sequentially receive data from each of the plurality of sensors based on corresponding addresses of the plurality of sensors stored in the table, store the data received from each of the plurality of sensors in a memory, and supply the stored data from the memory to the processor upon request.

According to another aspect, a method may be provided. The method may include storing a table of received addresses, sequentially receiving data from a sensor located at each address in the table via a serial data bus, storing the sensor data in a memory, receiving an address from a processor via a parallel data bus and providing stored sensor data associated with a sensor corresponding to the received address from the memory to the processor via a parallel data bus.

According to another aspect, a device may be provided. The device may include means for receiving an address of sensor via a parallel data bus, means for storing the received sensor addresses in a table, means for sequentially receiving sensor data from the sensor addresses stored in the table via a serial data bus, means for storing the sensor data in a memory and means for transmitting the stored read data to the processor via the parallel data bus.

BRIEF DESCRIPTION OF THE DRAWINGS

The accompanying drawings, which are incorporated in and constitute a part of this specification, illustrate embodiments described herein and, together with the description, explain the embodiments. In the drawings:

FIG. 4 is an exemplary table of records stored in the transaction table of FIG. 3;

FIG. 5 is an exemplary table of records stored in the sensor status cache of FIG. 3;

DETAILED DESCRIPTION

The following detailed description refers to the accompanying drawings. The same reference numbers in different drawings may identify the same or similar elements. In addition, while some of the following description is provided mainly in the context of routers or other network elements, the description provided herein may be applied to different types of network devices and/or other electrical devices which may not be network communication devices.

Figure 1:
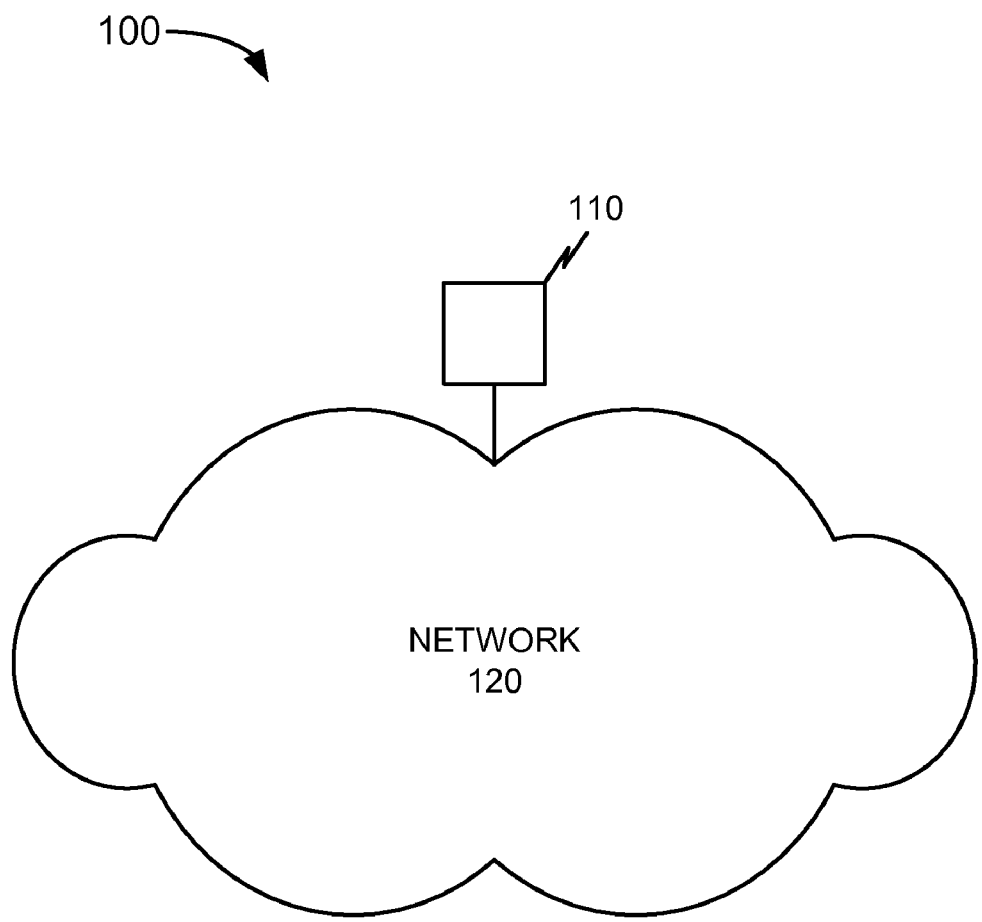
FIG. 1 shows a network in which concepts described herein may be implemented.

FIG. 1 shows an exemplary network in which concepts described herein may be implemented. As shown, network 100 may include network element 110 and a network 120. In practice, network 100 may include elements in addition to those illustrated in FIG. 1. Network element 110 may include a device for performing network-related functions, such as a router or a switch (e.g., a provider edge (PE) router in a MPLS network). Network 120 may include the Internet, an ad hoc network, a local area network (LAN), a wide area network (WAN), a metropolitan area network (MAN), a cellular network, a public switched telephone network (PSTN), any other network, or a combination of networks. Network element 110 may communicate with other network elements (not shown) in network 120 through a wired or wireless communication link.

Figure 2:
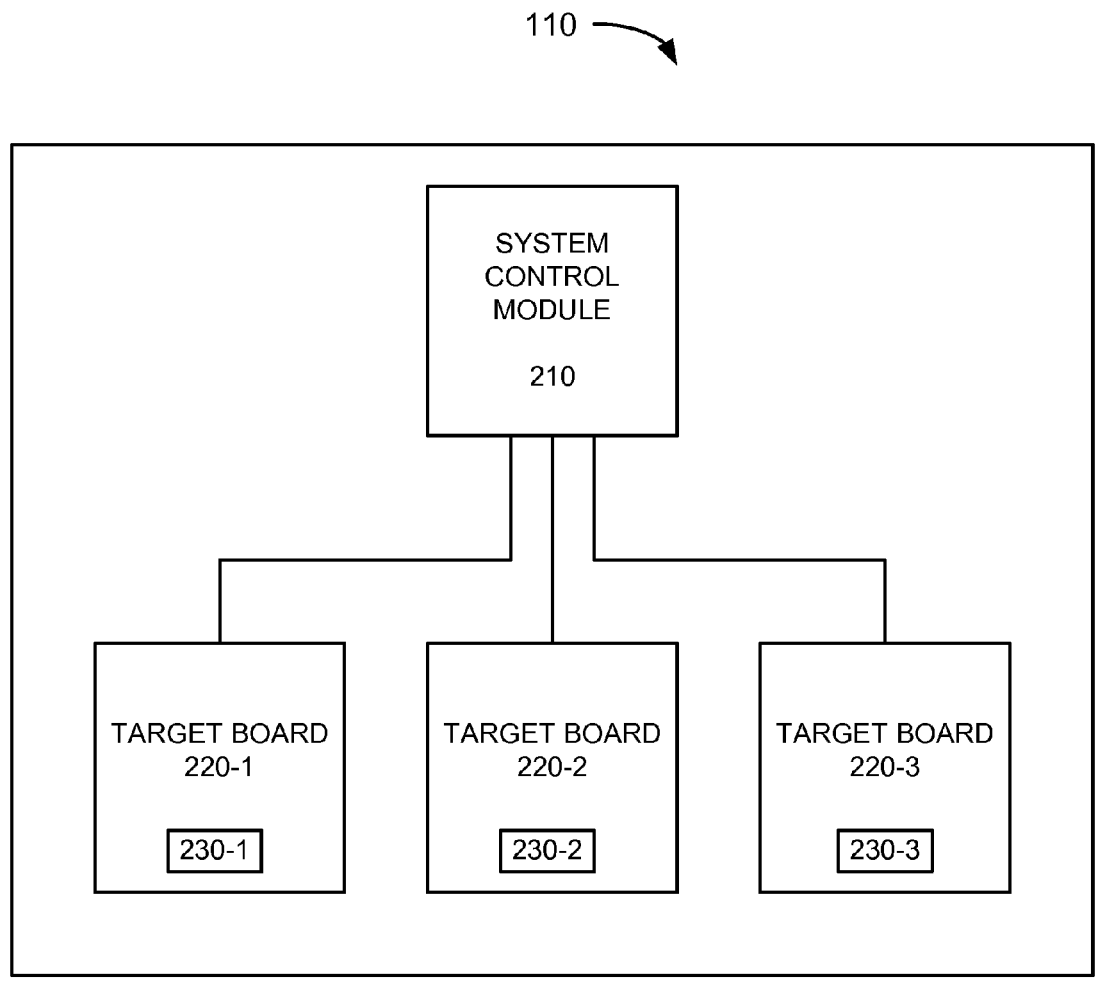
FIG. 2 is a block diagram of an exemplary device of FIG. 1.

FIG. 2 shows an exemplary block diagram of network element 110. As shown, network element 110 may include a system control module 210, target boards 220-1 to 220-3 (collectively referred to as target boards 220) and sensors 230-1 to 230-3 (collectively referred to as sensors 230) located within target boards 220-1 to 220-3, respectively. In other implementations, network element 110 may include fewer, additional, or different components than those illustrated in FIG. 2.

System control module 210 may include one or more processors, microprocessors, application specific integrated circuits (ASICs), field programming gate arrays (FPGAs), and/or or processing logic that may be optimized for networking and communications. System control module 210 may perform high level management functions for network element 110. For example, system control module 210 may communicate with other networks and systems connected to network element 110 to exchange information regarding network topology. System control module 210 may also control operations of target boards 220 and may monitor sensors 230 located within target boards 220. System control module 210 may also include a static memory (e.g. a read only memory (ROM)), a dynamic memory (e.g. a random access memory (RAM)), and/or onboard cache, for storing data and machine-readable instructions. System control module 210 may also include storage devices, such as a floppy disk, a CD ROM, a CD read/write (R/W) disc, and/or flash memory, as well as other types of storage devices.

Target boards 220 may include devices or assemblies, such as line cards, for receiving incoming data packets from network links and for transmitting data packets to network links. In other examples, target boards 220 may include Ethernet cards, optical carrier (OC) interfaces and asynchronous transfer mode (ATM) interfaces. Target boards 220 may also include processors, memories, and/or paths (such as an Inter-Integrated Circuit (I2C) bus) that permit communication between system control module 210 and sensors 230.

Sensors 230 may include any type of sensor device such as a voltage sensor or a temperature sensor. For example, when a target board 220 may be configured as a line card, each component within a line card, such as switches, memories and processors, may include a temperature sensor and a voltage sensor for monitoring temperature and voltage parameters within each component.

Figure 3:
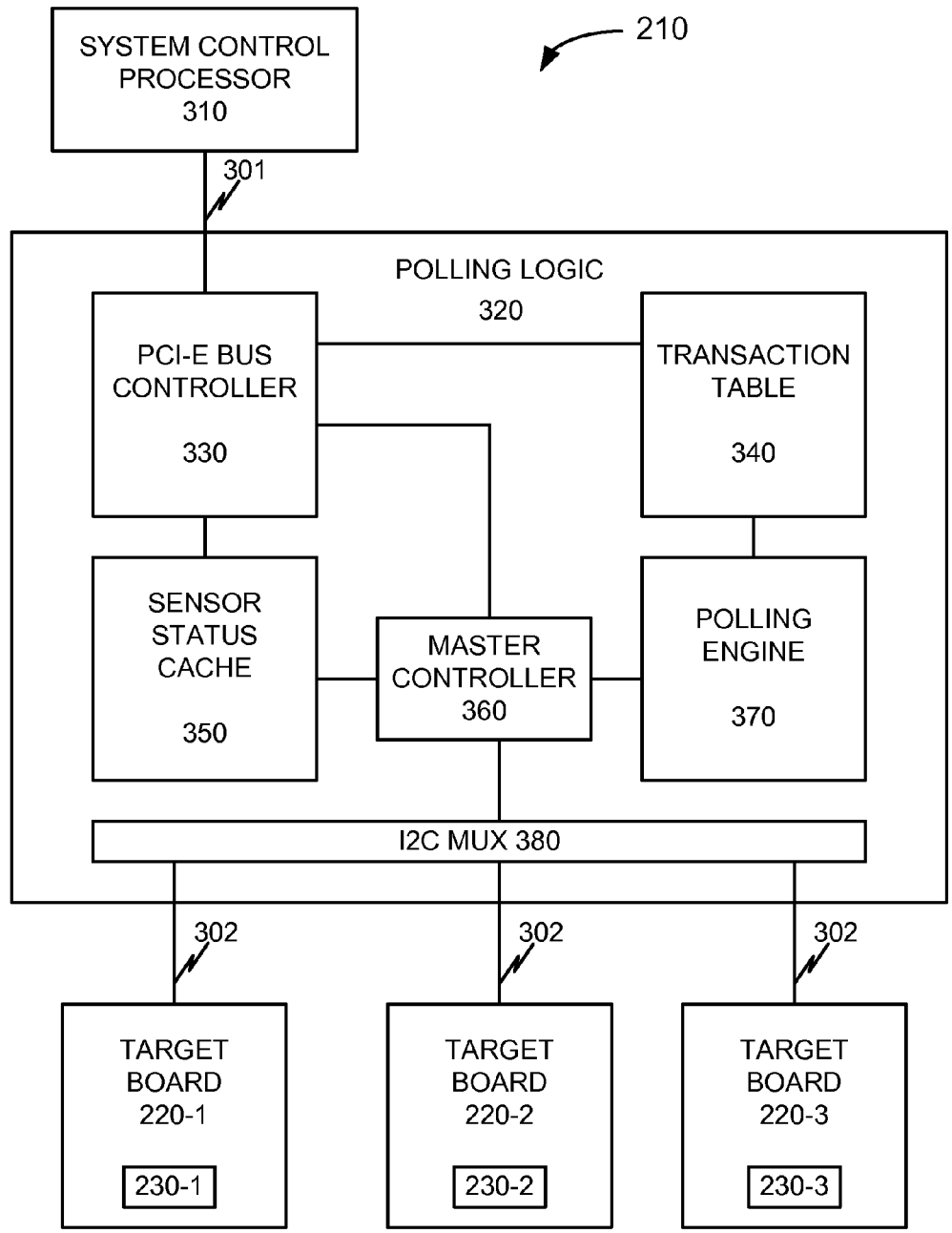
FIG. 3 is a functional block diagram of an exemplary device of FIGS. 1 and 2.

FIG. 3 is a block diagram of system control module 210 as shown in FIG. 2. As shown, system control module 210 may include a system control processor 310 and polling logic 320 that may include Peripheral Component Interconnect Express (PCI-E) bus controller 330, transaction table 340, sensor status cache 350, master controller 360, polling engine 370, and I2C multiplexer 380. As shown, polling logic 320 connects to system control processor 310 via PCI-E bus 301 and target boards 220 connect to polling logic 320 via I2C buses 302. In different implementations, system control module 210 may include fewer, additional, or different components than those illustrated in FIG. 3.

Peripheral Component Interconnect Express (PCI-E) bus 301 may include a high speed parallel bus. PCI-E bus 301 may connect system control processor 310 to polling logic 320.

Inter-Integrated Circuit (I2C) buses 302 may include a serial two wire bus. I2C buses 302 may connect polling logic 320 to target boards 220 and further connect to sensors 230.

System control module 310 may include hardware and/or software for receiving, storing, processing and/or forwarding data packets within network device 110. System control module 310 may include hardware and/or software for programming polling logic 320 to monitor sensor data received from sensors within target boards 220. System control module 310 may also transmit/receive information to/from other components within network element 110.

Polling logic 320 may include components 330-380 as described below in order to receive information from system control module 310 and perform polling of sensors 230. Components 330-380 as described below may be implemented as hardware, software, firmware or a combination of the aforementioned.

Peripheral Component Interconnect Express (PCI-E) bus controller 330 may include a high speed bus interface controller for transmitting/receiving, reading, and writing commands and information between system control processor 310 and polling logic 320. For example, PCI-E bus controller may transmit/receive an I2C address and/or information to/from system control processor 310. Additionally, PCI-E bus controller may transmit/receive the I2C bus address and/or information between components within polling logic 320, such as transaction table 340, master controller 360 and sensor status cache 350.

Transaction table 340 may include a number of records related to target boards 220 and sensors 230. For example, each record may include an address corresponding to a sensor 230 and other associated fields of information. Transaction table 340 may receive and store the address for each sensor 230 and other associated fields of information transmitted from system control processor 310. Transaction table 340 may be large enough to store data records relating to all sensors 230 located within network element 110. Transaction table 340 may supply a polling rate, sensor address and target board information to polling engine 370 for sensor data reading (polling). An example of data records stored in transaction table 340 is shown and described below with reference to FIG. 4.

Sensor status cache 350 may include a number of records of sensor data. For example, each record may include data read from a sensor 230 and associated fields of information. Sensor status cache 350 may store sensor data for every sensor 230 within network element 110, for example. Sensor status cache 350 may receive sensor data and related information from master controller 360 and/or PCI-E bus controller 330. An exemplary record in sensor status cache 350 is shown and described below with reference to FIG. 5.

Master controller 360 may include one or more processors, microprocessors, application specific integrated circuits (ASICs), field programming gate arrays (FPGAs), and/or processing logic for performing sensor reading (polling) functions. For example, master controller 360 may control functions related to operations between components shown in FIG. 3. For example, master controller 360 may receive target board information and a sensor address from polling engine 370. Master controller 360 may also receive sensor data from I2C MUX 380 and write the received sensor data into sensor status cache 350.

Polling engine 370 may include hardware and/or software for reading and receiving information from transaction table 340. For example, polling engine 370 may receive target board information and an address of a sensor from transaction table 340. Polling engine 370 may also access transaction table to determine how often to poll a sensor.

Inter-Integrated Circuit (I2C) multiplexer (MUX) 380 may include a multiplexing device capable of receiving information and determining and selecting a bus 302 to transmit information.

FIG. 4 is a diagram of an exemplary data 400 stored in transaction table 340. As shown, exemplary data 400 stored in transaction table 340 may include a number (shown as 1 to N) of entries/records. Each record may include fields 410-440 as described below.

Target board field 410 may contain information for identifying a target board 220. For example, each target board field 410 may contain information specifically identifying each of target boards 220-1 to 220-3.

Inter-Integrated Circuit (I2C) address field 420 may contain information for indicating an address of a sensor 230. For example, each sensor 230 may have a corresponding address on a corresponding I2C bus 302.

Size field 430 may contain information for indicating a size of stored data. For example, size field may store information indicating that the I2C address field 420 may be 8 or 16 bits of information.

Polling rate field 440 may contain information for identifying a rate at which a sensor may be polled. For example, polling engine 370 may poll sensors 230 at a rate determined by polling rate field 440. For example, information may be stored in polling rate field 440 that indicates that sensor 230-1 may be polled once a minute, while sensor 230-2 may be polled once a second.

FIG. 5 is a diagram of an exemplary data 500 stored in sensor status cache 350. As shown, exemplary data 500 stored in sensor status cache 350 may include a number (shown as 1 to N) of entries/records. Each record may include fields 510-540 as described below.

Target board field 510 may contain information for identifying a target board 220. For example, each target board field 510 may contain information specifically identifying each of target boards 220-1 to 220-3. The values in target board field 510 for each record in sensor status cache 350 may correspond to values in target board field 410 of transaction table 340.

Inter-Integrated Circuit (I2C) address field 520 may contain information for indicating an address of a sensor 230. For example, each sensor 230 may have a corresponding I2C bus address stored in I2C address field 520.

Sensor data field 530 may contain information relating to data read from a sensor 230. For example, data stored in field 530 may be a voltage value of the associated sensor is a voltage sensor and data stored in field 530 may be a temperature value if the associated sensor is a temperature sensor.

Time stamp field 540 may contain information identifying a time at which the data stored within a record may have been created/stored.

Figure 6:
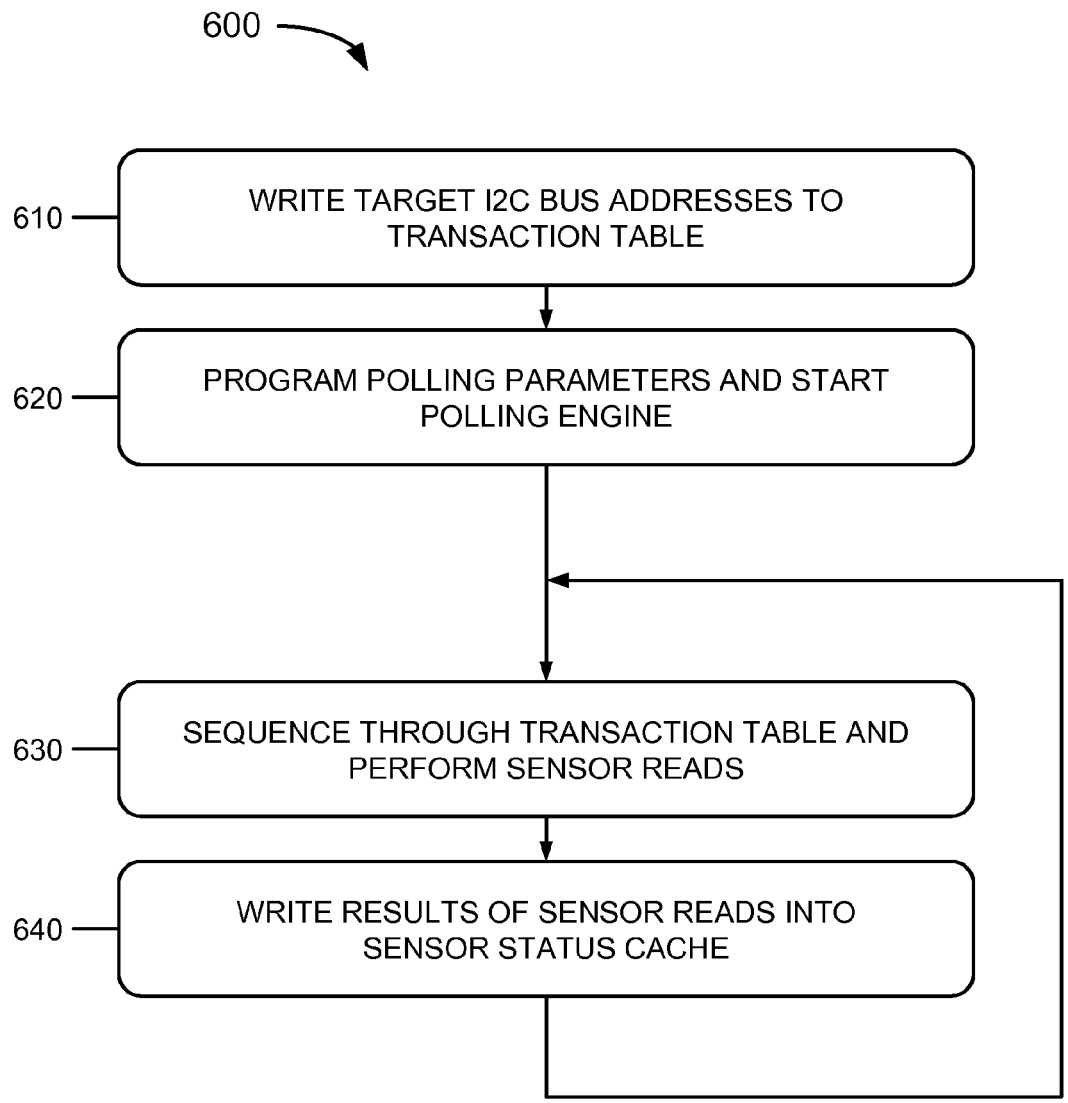
FIG. 6 is a flowchart of an exemplary process for polling sensors.

FIG. 6 shows an exemplary sensor polling process 600. Process 600 may begin when a target I2C bus address is received and written in transaction table 340 (block 610). For example, upon insertion or activation of a target board, system control processor 310 may transmit a target I2C bus address associated with a corresponding sensor via PCI-E bus 301 to PCI-E bus controller 330. PCI-E bus controller 330 may then transmit the target I2C bus address to transaction table 340 where the target I2C bus address is stored (as shown in FIG. 4) (block 610). System control processor 310 may also transmit additional information and parameters to be stored in transaction table 340. For example, as shown in FIG. 4, information identifying a target board and a polling rate may be received and stored (in fields 410 and 440 respectively) with an associated/corresponding target I2C bus address (as stored in field 420). After programming and storing polling parameters in transaction table 340, polling engine 370 may be started (block 620).

Polling engine 370 may then sequence through transaction table 340 to perform sensor reads (block 630). For example, polling engine 370 may sequentially read target board information and a target I2C bus address (from fields 410 and 420 respectively) of transaction table 340 and transmit this information to master controller 360. Master controller 360 may then transmit the target board information and the address to I2C MUX 380. I2C MUX 380 may then use the received target board information to select one of the number of I2C buses 302 and then use the received target I2C address to read data from an addressed sensor over the selected I2C bus 302. For example, target board information may identify target board 220-2, and the target I2C bus address may identify sensor 230-2 located on target board 220-2.

After accessing and reading data from a sensor, the results of the sensor reads are written into sensor status cache (block 640). For example, sensor data from sensor 230-3 may be transmitted from MUX 380 to master controller 360, where master controller 360 writes the sensor data into sensor status cache 350. As shown in FIG. 5 for example, data from sensor 230-3 may be stored in sensor data field 530 with corresponding information identifying a target board 220-3 and a time stamp (stored in fields 510 and 540 respectively). After writing sensor data into sensor status cache 350 (block 640), process 600 may return to block 630 to perform the next sequential sensor read from transaction table 340. In this manner, system control processor 310 may off-load sensor polling processes to be performed by polling logic 320.

In other examples, the records in transaction table 340 may be arranged or sorted by polling rate (as stored in field 440) so that sensors 230 that need to be polled more frequently are placed at the top of transaction table 340. In further examples, records in transaction table 340 may be arranged or sorted by target board (as indicated by field 410), so that each target board 220 may be sequentially monitored using transaction table 340.

Figure 7:
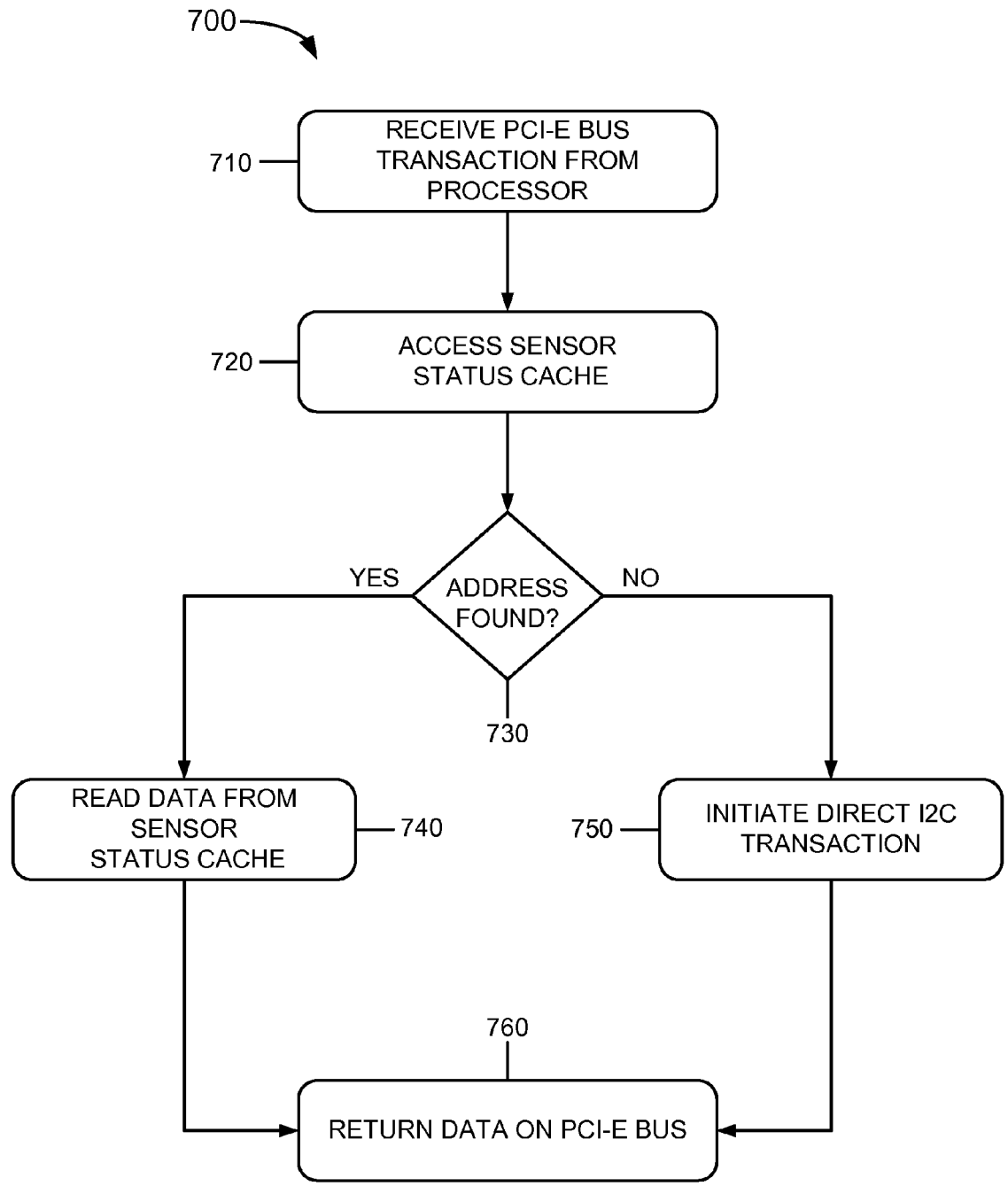
FIG. 7 is a flowchart of an exemplary process for reading sensor data.

FIG. 7 shows an exemplary sensor data reading process 700. Process 700 may begin when a PCI-E bus transaction is received from system control processor 310 (block 710). For example, system control processor 310 may transmit a target sensor I2C bus address used to read sensor data from sensor status cache 350. The transmitted (via PCI-E bus 301) target sensor I2C bus address may be received by PCI-E bus controller 330. PCI-E bus controller 330 may transmit the received target sensor I2C bus address to access sensor status cache 350 (block 720). As shown in FIG. 5 for example, sensor status cache 350 may store a number of target sensor I2C bus addresses (520) along with corresponding stored data 530.

After receiving a target sensor I2C bus address, it is determined if the received address is found within sensor status cache 350 (block 730). For example, the received target sensor I2C bus address may be compared to stored I2C addresses 520 within sensor status cache 350. If the received target sensor I2C bus address is found within sensor status cache 350 (Yes in block 730) sensor data may be read from sensor status cache 350 (block 740). For example, sensor data 530 that may be associated with the received target sensor I2C bus address 520 may be read and returned to PCI-E bus controller 330. Once the sensor data 530 has been received by PCI-E bus controller 330 it may be transmitted to system control processor 310 via PCI-E bus (block 760).

If, for example, a received target sensor I2C bus address does not match a stored target sensor I2C bus address within sensor status cache 350 (No in block 730), master controller 360 may initiate a direct I2C transaction (block 750). For example, master controller 360 may use the received target sensor I2C bus address to transmit a read operation via MUX 380 to read data from the addressed sensor 230. After reading the sensor data, master controller 360 may transmit this data to update sensor status cache 350 and may transmit this sensor data to PCI-E bus controller 330. Once PCI-E bus controller 330 receives the sensor data, it may be returned to system control processor 310 via PCI-E bus 305 (block 760). In this manner, when system control processor 310 transmits a sensor read command to polling logic 320, sensor data may be quickly returned from sensor status cache 350 without having to wait for a sensor read to be performed over an I2C address bus.

As described above, the embodiments allow sensor polling functions to be offloaded from the system control processor 310. Additionally, the sensor data may be stored and returned to the system control processor 310 quickly when needed. The foregoing description of implementations provides an illustration, but is not intended to be exhaustive or to limit the implementations to the precise form disclosed. Modifications and variations are possible in light of the above teachings or may be acquired from practice of the teachings.

For example, while series of blocks have been described with regard to the processes illustrated in FIGS. 6-7, the order of the blocks may be modified in other implementations. Further, non-dependent blocks may represent blocks that can be performed in parallel. For example, blocks 610-620 may be independent of blocks 630-640 and, therefore, may be performed in parallel to blocks 610-620. Further, it may be possible to omit blocks within a process.

It will be apparent that aspects described herein may be implemented in many different forms of software, firmware, and hardware in the implementations illustrated in the figures. The actual software code or specialized control hardware used to implement aspects does not limit the embodiments. Thus, the operation and behavior of the aspects were described without reference to the specific software code—it being understood that software and control hardware can be designed to implement the aspects based on the description herein.

Further, certain portions of the implementations have been described as "logic" that performs one or more functions. This logic may include hardware, such as a processor, an application specific integrated circuit, or a field programmable gate array, software, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, block, or instruction used in the present application should be construed as critical or essential to the implementations described herein unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
    receiving, by a device, an address of a particular sensor from a particular processor,
        the particular sensor being one of a plurality of sensors connected to the device via a first bus;
    storing, by the device and in a memory, the address of the particular sensor;
    reading, by the device and via the first bus, sensor data from the particular sensor based on the address stored in the memory;
    storing, by the device and in a cache, the address and the sensor data,
        the sensor data being stored in association with the address, and
        the cache being different from the memory;
    receiving, by the device, a target address from the particular processor;
    determining, by the device, whether the target address matches the address stored in the cache;
    reading, by the device, the sensor data from the cache when the target address matches the address stored in the cache; and
    transmitting, by the device and via a second bus, the sensor data to the particular processor when the target address matches the address stored in the cache,
        the second bus being different from the first bus.

2. The method of claim 1, where, when the target address does not match the address or any other address stored in the cache, the method further comprises:
    transmitting a read operation to read different sensor data from a different sensor that corresponds to the target address;
    receiving the different sensor data from the different sensor;
    storing, in the cache, the different sensor data in association with the target address; and
    transmitting the different sensor data.

3. The method of claim 1, where reading the sensor data from the particular sensor comprises:
    receiving information identifying a particular device that includes the particular sensor and information identifying a polling rate associated with the particular sensor; and
    reading, based on the information identifying the polling rate, the sensor data from the particular sensor by using the information identifying the particular device that includes the particular sensor.

4. The method of claim 3, where reading the sensor data from the particular sensor comprises:
    storing, in the memory and in association with the address, information identifying a polling rate; and
    polling the particular sensor, at a rate that is based on the information identifying the polling rate, to obtain the sensor data.

5. The method of claim 1, where reading the sensor data from the particular sensor comprises:
    storing, in the memory and in association with the address, information for receiving data from the particular sensor;
    selecting an Inter-Integrated Circuit (I2C) bus of a plurality of I2C buses based on the information for receiving data from the particular sensor; and
    receiving the sensor data of the particular sensor by using the selected I2C bus.

6. A system comprising:
    a device to:
        receive an address of a particular sensor from a particular processor,
            the particular sensor being one of a plurality of sensors connected to the device via a first bus,
        store, in a memory, the address of the particular sensor;
        read, via the first bus, data from the particular sensor based on the address stored in the memory;
        store, in a cache, the address and the data,
            the data being stored in association with the address, and
            the cache being different from the memory;
        receive a target address from the particular processor;
        determine whether the target address matches the address stored in the cache;
        read the data from the cache when the target address matches the address stored in the cache; and
        provide, via a second bus and to the particular processor, the data when the target address matches the address stored in the cache,
            the second bus being different from the first bus.

7. The system of claim 6, where, when reading the data from the particular sensor, the device is to:
    receive information identifying a particular device that includes the particular sensor;
    store, in the memory and in association with the address, the information identifying the particular device that includes the particular sensor; and
    read, based on the information identifying the particular device that includes the particular sensor, the data from the particular sensor.

8. The system of claim 6, where, when reading the data from the particular sensor, the device is to:
    store, in the first memory and in association with the address, the information identifying the particular sensor;
    select the first bus from a plurality of data buses based on the information identifying the particular sensor, and
    receive the data from the particular sensor by using the first bus.

9. The system of claim 6, where, when the target address does not match the address or any other address stored in the cache, the device is further to:
    read different data from a different sensor that corresponds to the target address; and
    transmit the different data, read from the different sensor, after receiving the target address.

10. The system of claim 6, where, when reading the data from the particular sensor, the device is to:
receive information identifying a polling rate associated with the particular sensor,
store, in the memory and in association with the address, the information identifying the polling rate, and
poll the particular sensor, at a rate that is based on the information identifying the polling rate, to obtain the data associated with the particular sensor.

11. The system of claim 6, where, the second bus is a Peripheral Component Interconnect Express (PCI-E) bus.

12. A non-transitory computer-readable medium comprising:
one or more instructions that, when executed by at least one device, cause the at least one device to:
receive an address of a first sensor from a particular processor,
the first sensor being one of a plurality of sensors connected to the device via a first bus;
store the address, of the first sensor, in a memory;
read, via the first bus, first data from the first sensor based on the address stored in the memory;
store the address and the first data in a cache, and
the cache being different from the memory;
determine whether a target address matches the address stored in the second memory,
transmit, via a second bus and to the particular processor, the first data, from the cache, when the target address matches the address stored in the cache,
the second bus being different from the first bus;
read second data from a second sensor that corresponds to the target address when the target address does not match the address or any other address stored in the cache; and
transmit the second data when the target address does not match the address or any other address stored in the cache.

13. The non-transitory computer-readable medium of claim 12, further comprising:
one or more instructions to receive a request,
the request comprising the target address, and
the first data or the second data being transmitted to the particular processor based on the request.

14. The non-transitory computer-readable medium of claim 12, where the one or more instructions to read the first data from the first sensor comprise:
one or more instructions to:
store, in the memory and in association with the address, information identifying a device that includes the first sensor, and
read, based on the information identifying the device that includes the first sensor and from the first sensor, the first data.

15. The non-transitory computer-readable medium of claim 12, where the one or more instructions to read the first data from the first sensor comprise:
one or more instructions to:
store, in the memory and in association with the address, information identifying a polling rate associated with the first sensor, and
poll the first sensor, at a rate that is based on the information identifying the polling rate, to obtain the first data.

16. The non-transitory computer-readable medium of claim 12, further comprising:
one or more instructions to:
sequentially read, based on another address stored in the memory, third data associated with a third sensor that corresponds to the other address, and
store, in the cache, the third data in association with the other address.

17. The method of claim 1, where the address is an Inter-Integrated Circuit (I2C) address.

18. The non-transitory computer-readable medium of claim 12, where at least one of the address or the target address is an Inter-Integrated Circuit (I2C) address.

* * * * *